US012333467B2

(12) United States Patent
Chinnamgari et al.

(10) Patent No.: US 12,333,467 B2
(45) Date of Patent: Jun. 17, 2025

(54) METHOD FOR CONTROLLING A PROCESS FOR HANDLING A CONFLICT AND RELATED ELECTRONIC DEVICE

(71) Applicant: Maersk A/S, Copenhagen K (DK)

(72) Inventors: Sunil Kumar Chinnamgari, Bangalore (IN); Abhishek Sanwaliya, Bangalore (IN); Anagh Majumder, Bangalore (IN); Sushma Rai, Bangalore (IN)

(73) Assignee: Maersk A/S, Copenhagen K (DK)

( * ) Notice: Subject to any disclaimer, the term of this patent is extended or adjusted under 35 U.S.C. 154(b) by 220 days.

(21) Appl. No.: 18/013,979

(22) PCT Filed: Jun. 30, 2021

(86) PCT No.: PCT/EP2021/068041
§ 371 (c)(1),
(2) Date: Dec. 30, 2022

(87) PCT Pub. No.: WO2022/008316
PCT Pub. Date: Jan. 13, 2022

(65) Prior Publication Data
US 2023/0289682 A1    Sep. 14, 2023

(30) Foreign Application Priority Data
Jul. 9, 2020    (DK) .............................. PA202070472

(51) Int. Cl.
*G06Q 10/0631*    (2023.01)
*G06Q 50/40*    (2024.01)

(52) U.S. Cl.
CPC ....... *G06Q 10/06313* (2013.01); *G06Q 50/40* (2024.01)

(58) Field of Classification Search
CPC .... G06Q 20/4016; G06Q 30/04; G06Q 40/12; G06Q 10/04; G06Q 30/0185;
(Continued)

(56) References Cited

U.S. PATENT DOCUMENTS 7,356,516 B2 * 4/2008 Richey ............... G06Q 30/0253
705/16
8,019,678 B2 * 9/2011 Wright .................. G06Q 40/00
705/38
(Continued)

FOREIGN PATENT DOCUMENTS

WO    2020060544 A1    3/2020

OTHER PUBLICATIONS

Carnerio, Davide et al., Online Dispute Resolution: an Artificial Intelligence Perspective Artificial Intelligence Review, vol. 41, 2014 (Year: 2014).*
(Continued)

*Primary Examiner* — Scott L Jarrett
(74) *Attorney, Agent, or Firm* — EIP US LLP

(57) ABSTRACT

Disclosed is a method, performed by an electronic device, for conflict process control. The method comprises obtaining a first data set from one or more systems; determining, based on the first data set and a predictive model having one or more parameters, one or more conflict data patterns indicative of a conflict; and predicting, based on the one or more conflict data patterns, a conflict result parameter and a confidence score associated with the conflict result parameter.

19 Claims, 6 Drawing Sheets

(58) Field of Classification Search
CPC ............. G06Q 30/0248; G06Q 20/102; G06Q 50/182; G06Q 20/401; G06F 11/2082; G06F 16/2365

See application file for complete search history.

(56) References Cited

U.S. PATENT DOCUMENTS

| | | | |
|---|---|---|---|
| 8,666,841 B1* | 3/2014 | Claridge | G06Q 30/00 705/26.1 |
| 10,319,003 B2* | 6/2019 | Rule | G06Q 50/188 |
| 10,825,012 B1* | 11/2020 | Senci | G06N 20/00 |
| 11,087,245 B2* | 8/2021 | Subramanian | G06N 7/01 |
| 11,151,573 B2* | 10/2021 | Ponniah | G06Q 20/405 |
| 11,218,494 B2* | 1/2022 | Wright | H04L 63/08 |
| 11,270,230 B1* | 3/2022 | Abreu | G06Q 20/4016 |
| 11,422,985 B2* | 8/2022 | Arvold | G06F 16/215 |
| 11,657,912 B2* | 5/2023 | Dunn | G16H 50/70 705/2 |
| 11,748,758 B2* | 9/2023 | Adjaoute | G06N 20/00 705/35 |
| 2004/0220838 A1 | 11/2004 | Bonissone et al. | |
| 2011/0047044 A1* | 2/2011 | Wright | G06Q 40/08 705/26.35 |
| 2012/0042354 A1 | 2/2012 | Vitiello et al. | |
| 2015/0254555 A1 | 9/2015 | Williams et al. | |
| 2016/0180256 A1 | 6/2016 | Renaud et al. | |
| 2017/0124631 A1 | 5/2017 | Bhandari et al. | |
| 2018/0075357 A1* | 3/2018 | Subramanian | G06N 20/00 |
| 2019/0066013 A1 | 2/2019 | Gupta et al. | |
| 2019/0213605 A1* | 7/2019 | Patel | G06Q 30/0185 |
| 2019/0378050 A1* | 12/2019 | Edkin | G06N 20/20 |
| 2020/0226503 A1* | 7/2020 | Subramanian | G06Q 10/04 |
| 2021/0150477 A1* | 5/2021 | Shrinivasan | H04L 9/3239 |
| 2021/0224810 A1* | 7/2021 | Benkreira | G06Q 20/4016 |
| 2021/0248612 A1* | 8/2021 | Adjaoute | G06N 20/00 |
| 2021/0264433 A1* | 8/2021 | Adjaoute | G06Q 20/4016 |
| 2022/0004923 A1* | 1/2022 | Kamkar | G06Q 40/03 |
| 2022/0147954 A1* | 5/2022 | Mohan | G06Q 20/102 |
| 2022/0172298 A1* | 6/2022 | Seal | G06N 3/08 |
| 2022/0191219 A1* | 6/2022 | Wright | H04L 63/08 |

OTHER PUBLICATIONS

Danish search report dated Jan. 21, 2021 for Danish Application No. PA 2020 70472.

International Search Report dated Oct. 6, 2021 for PCT Application No. PCT/EP2021/068041.

* cited by examiner

| | | |
|---|---|---|
| dispute_instance_id | 10003315-1 | 52 |
| country | South Africa | |
| is_priced_by_afls | Y | |
| trade_lane_name | EUROPE/SOUTHERN AFRICA (SAF-CPT) | |
| dispute_type | Freight | 53 |
| stuffed_commodity_code | [002905] | 52 |
| price_owner_churn_risk | 16.2 | 54 |
| is_isr | FALSE | 53 |
| charge_type | IMPORT | |
| total_invoiced_amount_in_usd | 2324.54 | 52 |
| redispute_count | 0 | 53 |
| customer_type | Tender - PLATINUM | 54 |
| reason_definition | AFLS - Incorrect Rate | 53 |
| price_owner_value_proposition | Ambition-SCL,Ambition-MSL | 54 |
| booked_ffes | 1.5 | 52 |
| origin_departure_delay | 37.21388889 | |
| operational_route_transport_sequence | FEEDER FOREIGN-MOTHER VESSEL~TRUCK | |
| charge_wb | [BAS] | 53 |
| is_gff | FALSE | |
| destination_arrival_delay | 81 | 52 |
| mapped_container_group | [40DRY, 40HDRY] | |
| is_tender | TRUE | 54 |
| shipment_status | Completed | 52 |
| is_oog | [No] | 53 |
| is_fmc_regulated | No | 52 |
| receipt_delivery_mode_del | SD | |
| is_reefer | [Yes] | |
| receipt_delivery_mode_rec | CY | |
| long_or_short_term | SHORTTERM | 54 |
| initiated_before_collection | FALSE | 53 |
| customer_commodity_text | Cotton, textiles | 52 |
| is_hazardous | No | |
| is_shipper_owned | [No] | |
| fmcexemptcommodity | No | |
| is_nor | [Yes] | |
| latest_pcd | 2018-08-27T00:00:00.000Z | 55 |
| opened_day | 24-11-2018 | |
| document_date | 23-09-2018 | |

Fig. 5

METHOD FOR CONTROLLING A PROCESS FOR HANDLING A CONFLICT AND RELATED ELECTRONIC DEVICE

CROSS-REFERENCE TO RELATED APPLICATIONS

This application is a 371 National Phase of International Application No. PCT/EP2021/068041, filed Jun. 30, 2021, which claims priority to Danish Application No. PA202070472 filed Jul. 9, 2020 under 35 U.S.C. § 119(a). Each of the above-referenced patent applications is incorporated by reference in its entirety.

The present disclosure pertains to the field of transport and logistics. The present disclosure relates to a method for controlling a process for handling a conflict and related electronic device.

BACKGROUND

Conflicts (such as invoice disputes, shipment disputes, fraud) are failure points in a process. For example, a user (e.g. a customer) has been either billed incorrectly or does not understand the charges billed, and raises a dispute on an invoice. The conflicts not only impact customer satisfaction, but also takes resources, and introduce delays. Conflicts are repetitive, however resolving a conflict requires going through a complex set of rules with numerous variations and with various systems involved.

Time in handling a conflict (e.g. a dispute) is significant, and may lead to an inconsistent handling of the conflict, and to an incorrect result of the conflict.

SUMMARY

There is a need for supporting the technical process of parsing, and processing data which forms part of the conflict process. There is a need for a tool which supports the conflict process and reduces the time to conflict resolution while maintaining/improving accuracy and consistency.

Accordingly, there is a need for an electronic device and a method for conflict process control, which mitigate, alleviate or address the shortcomings existing and provides a more time efficient control of the conflict process with improved accuracy and consistency.

Disclosed is a method, performed by an electronic device, for controlling a process for handling a conflict. The method comprises obtaining a first data set from one or more systems; determining, based on the first data set and a predictive model having one or more parameters, one or more conflict data patterns indicative of a conflict; and predicting, based on the one or more conflict data patterns, a conflict result parameter and a confidence score associated with the conflict result parameter.

Disclosed is an electronic device comprising memory circuitry, processor circuitry, and interface circuitry, wherein the electronic device is configured to perform any of the methods disclosed herein.

Disclosed is a computer readable storage medium storing one or more programs, the one or more programs comprising instructions, which when executed by an electronic device cause the electronic device to perform any of the methods disclosed herein.

It is an advantage of the present disclosure that the disclosed electronic device and method provide a more time efficient control of the conflict process with improved accuracy and consistency. Consequently, using the disclosed technique, a faster conflict resolution may be achieved, e.g. for one or more categories of conflicts. This leads to reducing the time per conflict control. The present disclosure provides, in one or more embodiment, a technique in which data related to conflict are stored, retrieved and processed, which improves the storage space used, the control of the conflict process and the speed of processing a conflict. It may be appreciated that the present disclosure provides a method and electronic device capable of handling complex conflicts (e.g. disputes), e.g. with a plurality of dimensions in the conflict data, e.g. from a plurality of systems.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which:

FIG. 5 is an illustration of an example data set.

DETAILED DESCRIPTION

Figure 1:
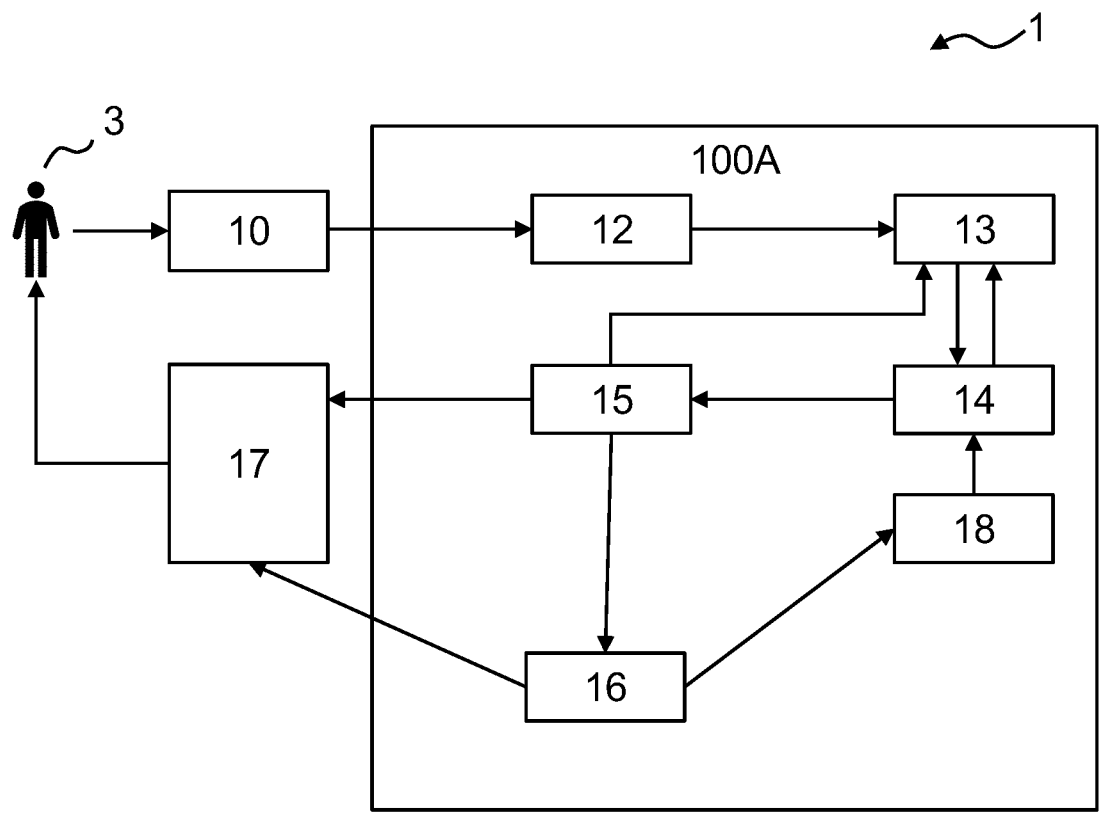
FIG. 1 is a diagram illustrating schematically a process where the disclosed technique is carried out by an example electronic device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

A conflict disclosed herein refers to an electronic conflict, such a conflict identifiable in an electronic system, such as a conflict in a transaction in an electronic system. For example, a conflict may be indicative of a dispute and/or a fraud. For example, a dispute may be regarding invoicing, shipment, and/or quality of goods. A conflict can be represented or characterized by data conflict, between e.g. two or more conflicting data sets.

FIG. 1 shows a diagram illustrating schematically a process where the disclosed technique 100A is carried out by an example electronic device according to this disclosure.

A user 3 may send a communication (e.g. email) regarding a conflict (e.g. a dispute related to e.g. an invoice). This results in conflict data (e.g. dispute data, e.g. a booking information, invoice data, etc.), which may be seen as a first data set and/or a second data set according to this disclosure. For example, booking information with respective shipment details for customer may be feed into a data transformation step 12 of the disclosed technique 100A. For example the data transformation step 12 may prove feature selection to a parameter tuning step 13 (e.g. hyperparameter tuning). The parameter tuning step 13 provides one or more parameters to the predictive model 14 to run experiments with a parameter combination(s) and receives a feedback input from a predictive model 14. The feedback input may be related to the best parameter selection.

The predictive model 14 determines based on the first data set and the one or more parameters, one or more conflict data patterns indicative of a conflict and provides the one or more conflict data patterns to a prediction scoring step 15 which predicts based on the one or more conflict data patterns, a conflict result parameter and a confidence score associated with the conflict result parameter, and may provide the conflict result parameter and the confidence score to an auto-classifier step 17 for conflict resolution. The auto-classifier step 17 for conflict resolution may provide the conflict result to the user 3.

The parameter tuning step 13 can take confidence score(s) as input from a prediction scoring step 15. In other words, the prediction scoring step 15 provides one or more confidence scores to the parameter tuning step 13, e.g. one or more predicted confidence scores. For example, the confidence score can be further converted to a predicted class (dispute/non-dispute) depending on values (e.g. >0.5=dispute, <0.5 non-dispute).

The prediction scoring step 15 may determine whether the confidence score satisfies a criterion, and when it is determined that the confidence score does not satisfy the criterion, prediction scoring step 15 may include transmitting a request to the approval authority step or system 16. The approval authority step or system 16 may revert with a tuning feed to provide misclassified cases to step 18, which may be used to further tune the predictive model 14. The prediction scoring step 15 may determine whether the confidence score satisfies a criterion, and when the confidence score does not satisfy the criterion, prediction scoring step 15 may include transmitting a request to the approval authority step or system 16.

The disclosed technique may be seen as an automated conflict identification and resolution (e.g. accepted/declined), e.g. for booking invoices against which dispute has been raised by consigner from a specific geography. For example, the disclosed output eliminates manual intervention which causes delay in determining the acceptance or decline of raised dispute incident. The manual intervention is subjected to agent's response which goes back and forth till the time of resolution, consequently, introduces delays in the conflict process.

With an end to end conflict process control, the disclosed technique can exploit input data related to conflict by leveraging prediction and scoring based on a predictive model, which leads to a faster resolution of conflicts. The disclosed technique may be seen as converging fasted to a root-causes of a conflict and solving the conflict in a time efficient manner.

The disclosed technique may be applicable for a conflict identification across domains which have a customer service domain.

Figure 2A:
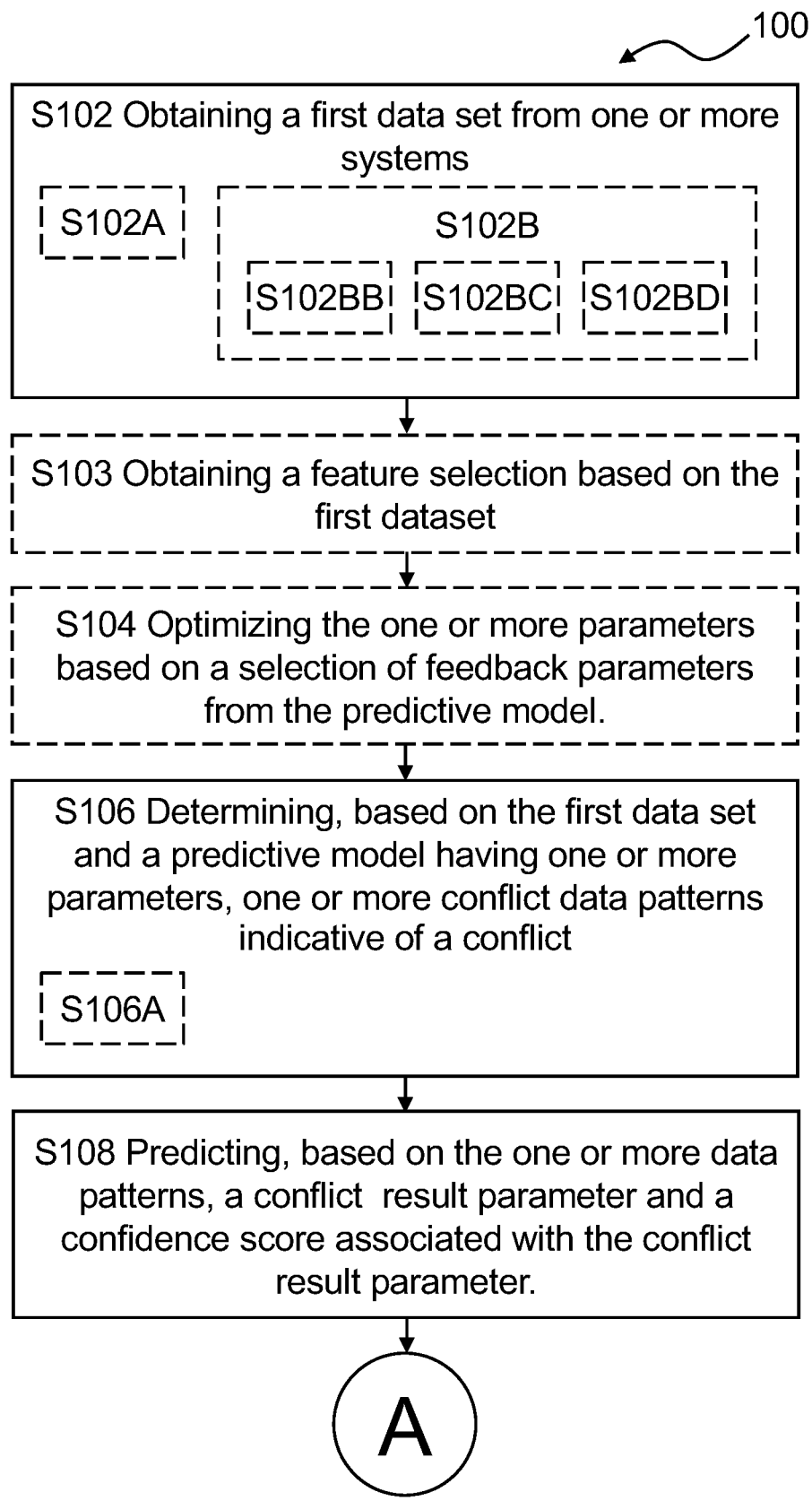
FIGS. 2A-B show flow diagrams illustrating an example method, performed by an electronic device, for assigning items into one or more containers according to this disclosure.
Figure 2B:
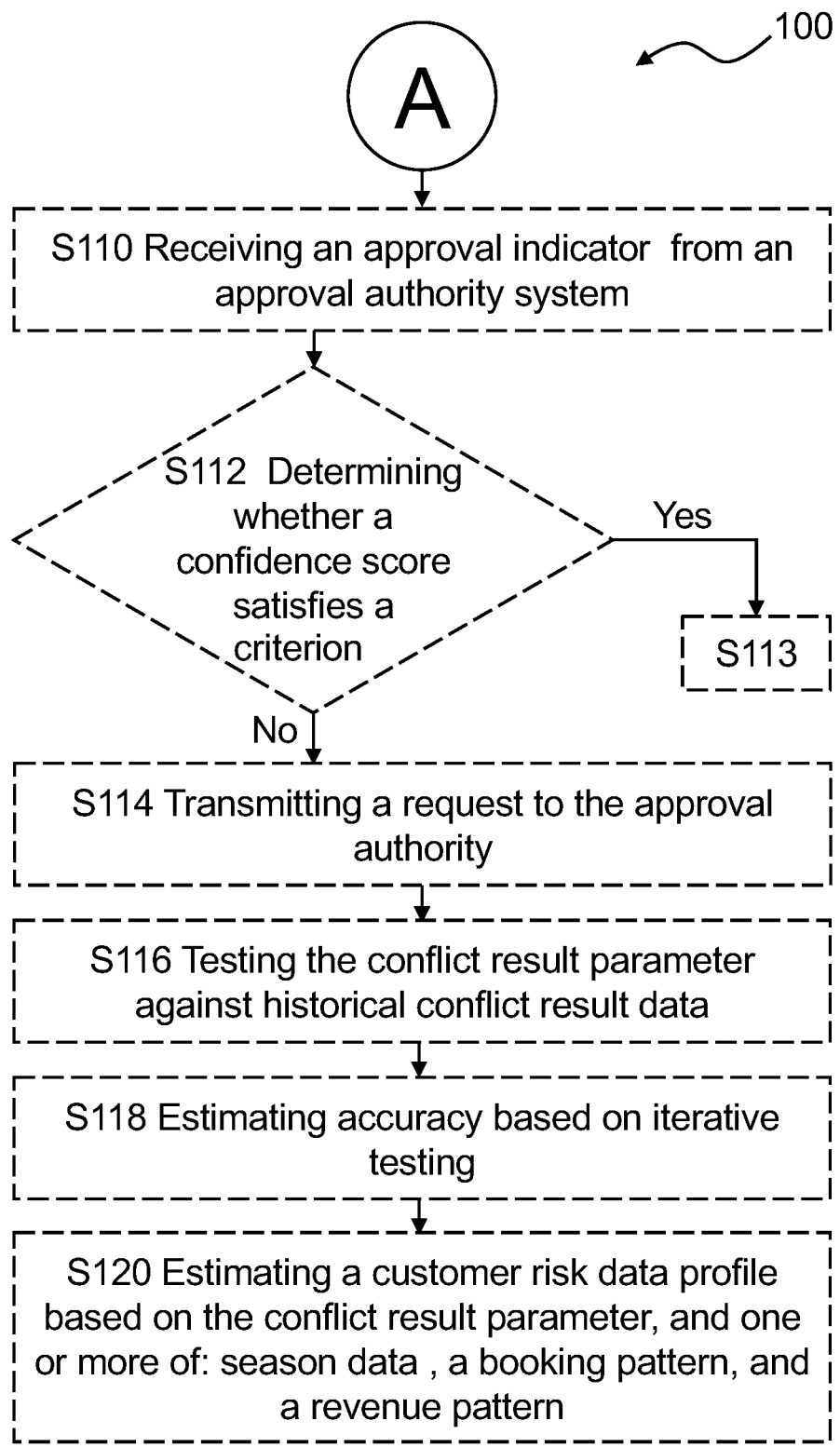

FIGS. 2A-B show flow diagrams of an example method 100, performed by an electronic device, for controlling a conflict process, e.g. for controlling a process for handling a conflict according to the disclosure. In other words, the method 100 may be seen as for handling a conflict process, e.g. for conflict result prediction, e.g. for predicting a conflict result, e.g. a conflict result parameter. For example, the method 100 may be performed for determining a conflict result prediction, e.g. a conflict result prediction parameter. For example, the method 100 may be performed for controlling a conflict process, such as for controlling an electronic device configured to handle an electronic conflict. A process for handling a conflict may be seen as a process for controlling a system for characterizing, predicting an outcome and/or solving a conflict.

The method 100 comprises obtaining S102 a first data set from one or more systems. An system may be seen as a system configured to monitor, control and/or manage one or more tasks, one or more operations and/or one or more processes in transport and logistics. In one or more example methods, the one or more systems are operation systems. In some examples, the one or more operation systems comprise one or more of: a shipment system, a dispute resolution system, a customer system, an invoicing system, and a case management system. For example, the first data set may be obtained from one or more of: a shipment system, a dispute resolution system, a customer system, an invoicing system, and a case management system. The first data set may comprise one or more first data elements. In one or more embodiments, the first data set comprises a plurality of first data elements. An example of the first data set may be illustrated by FIG. 5. The first data set may have one or more dimensions. A dimension may be indicative of a source of a first data element of the first data set. In one or more embodiments, the first data set has a plurality of dimensions. The plurality of dimensions may be related to the one or more systems which are the source of the first data set, e.g. one or more of: a shipment system, a dispute resolution system, a customer system, an invoicing system, and a case management system. For example, the one or more dimensions may comprise a first dimension indicative of shipment, a second dimension indicative of dispute, a third dimension indicative of a customer, a fourth dimension indicative of time (e.g. a date and/or time), and/or a fifth dimension indicative of an invoice. For example, the first data set may be indicative of dispute related information e.g. coming from invoices raised at the time of booking made by customers. For example, the dispute related information can be enhanced (such as augmented) with shipment details and respective time dimension.

The method 100 comprises determining S106, based on the first data set and a predictive model having one or more parameters, one or more conflict data patterns indicative of a conflict. In one or more example methods, the one or more conflict data patterns comprise a booking data pattern, a dispute data pattern, and/or a revenue data pattern. For example, the electronic device can take input online (e.g. from a customer system, such as a Systems Application Product system) and from transactional feed (e.g. from a case management database). Feeds can further be processed and utilized by the predictive model (such as one or more predictive machine-learning (Artificial Intelligence, AI) models) which exploit, and/or take into account diversified dimensions coming from the first data set to identify and/or determine the one or more conflict data patterns. The predictive models can be deployed across multiple levels, such as: A) Dispute category identification (e.g. with example indicators: 'rate', 'already paid' etc.); B) Dispute outcome classification (e.g. with example indicators: 'accepted'/'decline') and C) Fraud Detection (e.g. Risk Categorization/Scoring).

For example, the first data set may be seen as providing diversified data fields which may enable the predictive model to learn pattern effectively and apply the same to make predictions.

Figure 4:
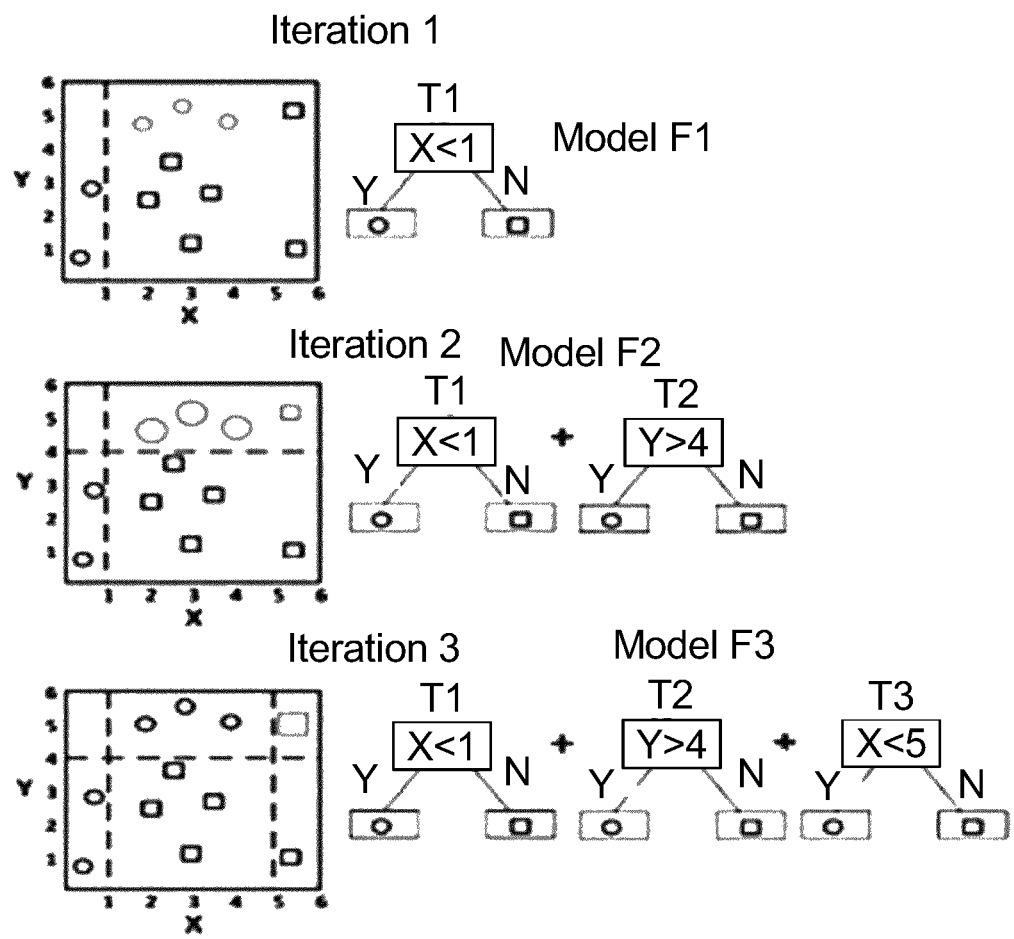
FIG. 4 is an illustration of an exemplary method according this disclosure presented as scheme.

The predictive model disclosed herein refers to a predictive scheme and/or a predictive computational technique. It may be envisaged that a predictive engine may be performing operation(s) based on the predictive model and/or predictive scheme. The predictive model may comprise a plurality of models for prediction. In one or more example methods, the predictive model comprises one or more of: an ensemble technique, a classification model, a tree-based model, and a combination of any of the ensemble technique, the classification model, and the tree-based model based on one or more weight factors. Ensemble methods or ensemble techniques combine for example several decision trees classifiers to produce better predictive performance than a single decision tree classifier. With the ensemble technique, a group of weak learning techniques are combined to form a strong learning technique, thus increasing the accuracy of the predictive model. For example, the predictive model comprises a combination of: a classification model (e.g. a classifier, or a classifier scheme, e.g. probabilistic and kernel based polynomial scheme) and a tree-based model using one or more weight factors. For example, the combination may be performed by applying an ensemble technique (based on one or more weight factors) of the classification model, and the tree-based model. For example, the combination of a first classification scheme and a first tree-based scheme by a weightage mechanism may lead to a prediction with an acceptable score and promote the corresponding first scheme in a successive step, and in iterative manner to boost the first scheme, which in turn boosts the second scheme, which in turn boosts the third scheme (as illustrated in FIG. 4). A heuristic-based technique may be used to define the relation between the first scheme, the second scheme and the third scheme. The predictive model based on the ensemble technique can provide a stronger classifier. Multiple classification models have been evaluated as part of the predictive model to finally devise ensemble models which assured high accuracy and wide extendibility for scenarios and cases (e.g. dispute identification, fraud detection, email based dispute handling etc.). For example, the ensemble model or ensemble technique may combine a number of decision trees of certain type (e.g. Boosted tree, Iterative Dichotimiser 3 (ID3), C4-5, Classification and Regression Tree (CART), Chi-square automatic interaction detection (CHAID)), with a specific depth range, a split size, a classifier type (e.g. linear, Support Vector Machine, Kernel, Convolutional neural network(s) etc.). For example, the ensemble model or ensemble technique may combine a number of estimators (e.g. trees—experimented over range of 50 to 500) with a specific depth range (experimented with range of 1 to 10).

In one or more example methods, the one or more parameters comprise one or more parameters for configuration of the predictive model (e.g. for initial configuration of the learning process, e.g. model parameters, e.g. for the tuning of the prediction model). For example, one or more parameters for configuration of the predictive model comprise one or more hyperparameters. The hyperparameter may be seen as a parameter set before the learning process which helps in experimenting with the classifier in defined manner. For example, the one or more hyperparameters comprise one or more of: a number of predictive models used for making predictions on different parts of data (e.g. number of predictive models to experiment and optimize (tuning) may be 50, 100, 150 etc.), a minimum sample split required to make prediction (e.g. a minimum sample split may be 20, 30, 40, 100, 100 k etc.), a learning rate parameter which support converging to an optimal solution (a learning rate parameter could be any of: 0.01, 0.001, 0.8 etc.), and a depth parameter of the prediction model—determines complexity of model (e.g. a depth parameter may be less than 10, such as less than 5, such as 1, or 2). For example, the one or more hyperparameters comprise a split size. For example, a minimum sample split can determine a minimum number of data points required to split at each node of decision tree. For example, when this condition is not fulfilled, then further splitting may stop and that node is to be considered final node in decision tree. The minimum sample split can be determined from the first data set, e.g. first data instances.

With multi-dimensional data to predict conflict outcome, the present disclosure enables automatic selection of machine learning/AI models as the predictive model across wide range in conjunction with hyper-parameter tuning to yield 'best in class' accuracy. The disclosed technique is capable of generating precise forecast with optimal (minimum) error/accuracy trade-off.

In one or more example methods, the method comprises optimizing S104 the one or more parameters based on a selection of feedback parameters from the predictive model. The feedback parameters may comprise parameters that indicate a manual audited decision whether this is actual conflict or not which are further fed back to a training module to enhance systems capability with additional learning. For example, optimizing S104 the one or more parameters (e.g. the one or more hyperparameters) may comprise tuning the one or more parameters to provide the most optimal parameters (e.g. the best parameters) to the predictive model. For example, hyperparameter tuning can provide est parameters for configuring the predictive model which can consequently provide best prediction estimates. This may be advantageous in operations (e.g. booking) to quickly resolve a conflict (e.g. dispute) and accelerate the resolution cycle (e.g. payment cycle). Also this may help identifying potential conflict cases when data is analyzed at invoice generation stage. For example, identifying early potential conflict(s) may allow prevention of a propagation of a technical error.

The method 100 comprises predicting S108, based on the one or more conflict data patterns, a conflict result parameter and a confidence score associated with the conflict result parameter. In one or more embodiments, the conflict result parameter includes a dispute result parameter and/or a fraud result parameter. For example, the conflict result parameter may be seen a conflict resolution parameter, such as a dispute resolution parameter, and/or a fraud resolution parameter. The confidence score may be generated by determining a probability score which is generated on the basis of feature values which classifier learns during training.

In one or more example methods, the conflict result parameter indicates that a conflict exists or that a conflict does not exist. In one or more example methods, the conflict result parameter indicates a likelihood that a conflict exists or a likelihood that a conflict does not exist. The confidence score associated with the conflict result parameter supports the conflict resolution or solving the conflict. For example, a confidence score (e.g. ranging from 0 to 1) is assigned while making the prediction. For example, a high confidence score leads a conflict resolution according to the conflict result parameter (e.g. accept/approve or decline).

The predicted conflict result parameter and the confidence score lead to an electronic automated assessment of the conflict, e.g. whether a raised conflict is to be accepted or declined with the associated confidence score.

The predicted conflict result parameter and the confidence score are used by the electronic device to output a conflict result (e.g. 'accept' or 'decline'). In one more example methods, the conflict result indicates a conflict (that a conflict is accepted (for example, a dispute accepted) or that a conflict is not accepted (for example, a dispute not accepted)). A conflict resolution indicates whether to accept or decline the conflict.

In one or more example methods, obtaining S102 the first data set comprises obtaining S102A a second data set from the one or more systems (e.g. receiving and/or retrieving the second data set). In one or more example methods, obtaining S102 the first data set comprises pre-processing S102B the second data set to obtain the first data set. The second data set may be seen as a raw input data set that needs some pre-processing so as to reduce noise, normalize and standardize the raw input data set for providing the first data set. Noise in a data set may refer to corruption in the data set, such as additional meaningless or incorrect data elements.

In one or more example methods, pre-processing S102B the second data set comprises reducing S102BB noise in the second data set. Reducing S102BB the noise in the second data set may comprise removing features identified as noisy. Reducing S102BB the noise in the second data set may comprise lowering down the importance of particular feature(s). The noise in the second data set may be seen as cancelled, removed and/or suppressed. The pre-processed second data set may include a data set where noise is cancelled, nullified (e.g. noise level after pre-processing=0). In one or more example methods, pre-processing S102B the second data set comprises normalizing S102BC the second data set. Normalizing a data set may refer to restricting the data set so that attributes of data elements of the data set are standardized to comply with one or more of the same representation "norms" or types. A normalization may be performed using scaling, and/or encoding. For example the second data set includes one or more second data elements, such as second data element(s) related to a category (e.g. a city), second data element(s) related to a range, second data element(s) which is numerical. The second data set may be normalized across the second data set. For example, a second data element indicating New York is normalized with a numerical representation associated with the city of New York (e.g. by numeral encoding).

In one or more example methods, pre-processing S102B the second data set comprises applying S102BD a transformation to the second data set. For example, the transformation can take as input the second data set (e.g. raw data as input) and apply scaling e.g. to make vector (e.g. column) of the second data set standardised to remove bias for any data element (e.g. variable, vector, column) for example due to different scale.

For example, the data element 'booked_ffes' of the second data set may be seen as a variable which captures total containers booked by a customer which takes continues range from 0.5 till thousands. For example, another data element of the second data set e.g. 'price_owner_churn_risk' takes value in range of 0 to 100. For example if the disclosed predictive model disclosed herein takes such data set as input, the predictive model may be biased for high range data i.e. 'booked_ffes' so it may result into biasness while making predictions and can yield to incorrect prediction. It may be advantageous to scale data elements of the raw data set, i.e. the second data set, (e.g. features/variables of the data before getting into model building phase). Another transformation may be encoding. For example, categorical variables like 'charge_type' (import or export) need to be represented as encoded numerical representation because the machine learning model may not be capable of processing 'strings' or characters.

It may be appreciated that the data taken as the first data set for the predictive model disclosed herein is cleansed, normalized and transformed to feed into the disclosed predictive model (e.g. AI classification model). The predictive model based on classification engine may perform estimation based on best parameter evaluation to provide robust and best-in-class accuracy model.

In one or more example methods, the method 100 comprises obtaining S103 a feature selection based on the first data set. For example, the feature selection is obtained by applying feature importance analysis to the first data set. For example, not all data elements of the first data set are to contribute to prediction. In other words, the feature importance analysis provides selected features which are advantageous to make predictive model. In one or more example methods, the one or more conflict data patterns are further determined based on the feature selection. For example determining S106 the one or more conflict data patterns comprises determining the one or more conflict data patterns based on the feature selections.

In one or more example methods, the method 100 comprises determining S112 whether a confidence score satisfies a criterion. The criterion may be based on a threshold. For example, determining S112 whether a confidence score satisfies a criterion may comprise determining whether the confidence score is above or equal to a threshold.

In one or more example methods, the method comprises, when it is determined that the confidence score does not satisfy the criterion, transmitting S114 a request to the approval authority system. An approval authority system may refer to a system which has authority to approve or disapprove a conflict result. An approval authority system may involve a conflict resolution approval/disapproval by an individual. For example, the approval authority system may use a Global Authority Matrix which gives approval permissions to individuals. For example, when it is determined that the confidence score is below a threshold value (e.g. 0.8), then the electronic device transmits the request to approval authority system. For example, the method may comprise: when the confidence score is determined not to satisfy the criterion, transmitting S114 a request to the approval authority system. For example, the method may comprise: when the confidence score is determined to satisfy the criterion, providing S113 the conflict result to a user in accordance with the conflict result parameter. For example, the method may comprise: when the confidence score is determined to satisfy the criterion, providing the conflict result to an electronic device in accordance with the conflict result parameter. For example, the method may comprise: when the confidence score is determined to satisfy the criterion, controlling a system based on the conflict result. For example, the method may comprise: when the confidence score is determined to satisfy the criterion, instructing a system, based on the conflict result, to resolve the conflict or not to resolve the conflict.

In one or more example methods, the method comprises when it is determined that the confidence score satisfies the criterion, providing S113 the conflict result to a user in accordance to the conflict result parameter. In one or more example methods, the method comprises when it is determined that the confidence score satisfies the criterion, refraining from transmitting the request to the approval authority system. For example, when it is determined that the confidence score is above or equal a threshold value (e.g. 0.8), then the request is not transmitted to the approval authority system for verification, and direct action can be taken (accept/decline), which leads to an auto resolution for the conflict (e.g. a dispute). The conflict result prediction determines a category for which resolution has been provided as auto approval or decline.

In one or more example methods, the method comprises when the confidence score satisfies the criterion, providing S113 the conflict result to a user in accordance with the conflict result parameter. In one or more example methods, the method comprises when t the confidence score satisfies the criterion, refraining from transmitting the request to the approval authority system. For example, when the confidence score is above or equal a threshold value (e.g. 0.8), then the request is not transmitted to the approval authority system for verification, and direct action can be taken (accept/decline), which leads to an auto resolution for the conflict (e.g. a dispute).

In one or more example methods, the method 100 comprises receiving S110 an approval indicator from an approval authority system. For example the approval indicator may be seen as a feedback loop for a tuning feed (as illustrated in FIG. 1) to improve the one or more parameters of the predictive model.

In one or more example methods, the method comprises determining S106, based on the first data set and the predictive model having one or more parameters, the one or more conflict data patterns comprises determining S106A the one or more conflict data patterns, based on the first data set, the predictive model having one or more parameters, and the approval indicator.

In one or more example methods, the method 100 comprises testing S116 the conflict result parameter against historical conflict result data. For example, testing S116 may comprise comparing the conflict result parameter against the historical conflict result data.

In one or more example methods, the method 100 comprises estimating S118 accuracy based on iterative testing. For example, the accuracy of the conflict result parameter may be estimated based on an iterative comparison of the conflict result parameter against the historical conflict result data.

In one or more example methods, the method 100 comprises estimating S120 a customer risk data profile based on the conflict result parameter, and one or more of: season data, a booking pattern, and a revenue pattern. The season data may comprise historical data of the claims, indicator for future disputes, another signal indicating some bias. For example, the predicted outcome may further be evaluated against relation complexity with customer (historical booking pattern). For example when the complexity is low, then the predicted conflict result parameter and associated confidence score is considered to assess dispute acceptance. For example, the disclosed electronic device is capable to take 'text' data from case management system and booking details to predict a dispute outcome. The outcome can be analysed with seasonality, revenue and booking pattern to estimate risk profile of customer.

The method 100 may comprise storing, in part of the memory circuitry, the one or more parameters of the predictive model, the conflict result parameter and associated confidence score.

Figure 3:
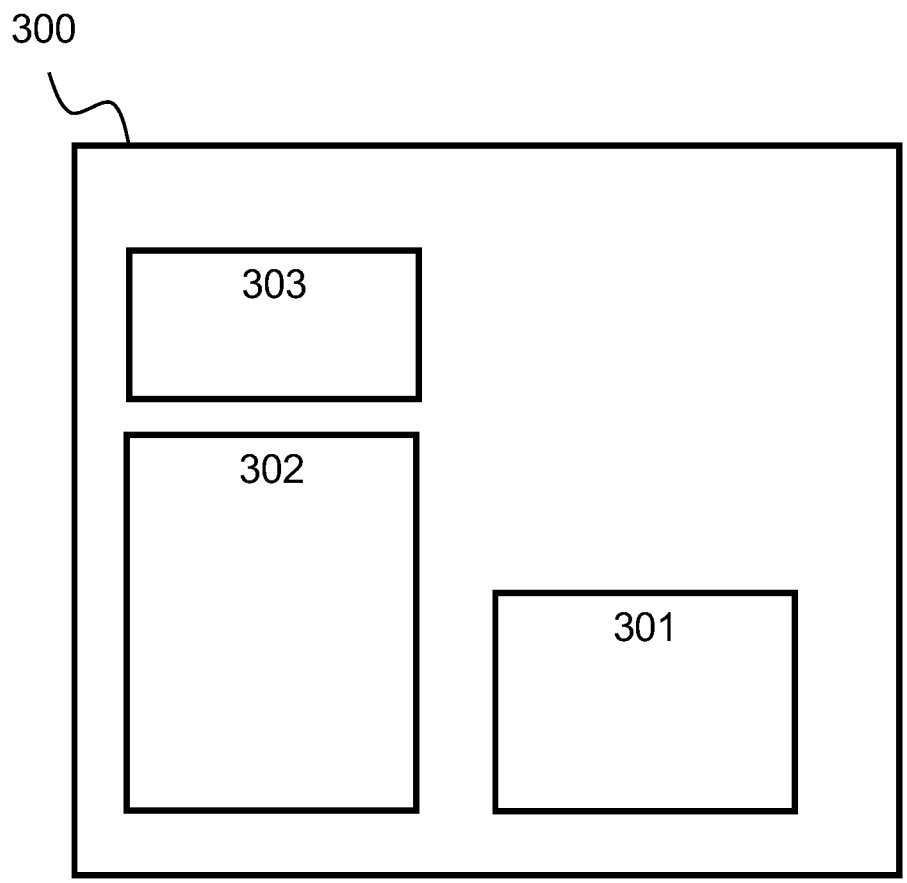
FIG. 3 is a block diagram illustrating an exemplary electronic device according to this disclosure.

FIG. 3 shows a block diagram of an exemplary electronic device 300 according to the disclosure. The electronic device 300 comprises memory circuitry 301, processor circuitry 302, and interface circuitry 303. The electronic device 300 is configured to perform any of the methods disclosed in FIGS. 2A-B.

The electronic device 300 is configured to obtain (such as using the processor circuitry 302, and such as via the interface circuitry 303) a first data set from one or more systems. The first data set may have a plurality of dimensions.

The electronic device 300 is configured to determine (such as using the processor circuitry 302), based on the first data set and a predictive model having one or more parameters, one or more conflict data patterns indicative of a conflict.

The electronic device 300 is configured to predict (such as using the processor circuitry 302), based on the one or more conflict data patterns, a conflict result parameter and a confidence score associated with the conflict result parameter.

In one or more embodiments, the one or more systems comprise one or more of: a shipment system, a dispute resolution system, a customer system, an invoicing system, and a case management system.

In one or more embodiments, the one or more conflict data patterns are further determined based on the feature selection.

In one or more embodiments, the one or more parameters comprise one or more hyperparameters.

In one or more embodiments, the predictive model comprises one or more of: an ensemble technique, a classification model, a tree-based model, and a combination of any of the ensemble technique, the classification model, and the tree-based model based on one or more weight factors.

In one or more embodiments, the one or more conflict data patterns comprise a booking data pattern, a dispute data pattern, and a revenue data pattern.

In one or more embodiments, the conflict result parameter indicates that a conflict exists or that a conflict does not exist.

In one or more embodiments, the conflict result parameter indicates a likelihood that a conflict exists or a likelihood that a conflict does not exist.

The processor circuitry 302 is optionally configured to perform any of the operations disclosed in FIGS. 2A-B (such as any one or more of: S102A, S102B, S102BB, S102BC, S102BD, S103, S104, S106A, S110, S112, S113, S114, S116, S118, S120). The operations of the electronic device 300 may be embodied in the form of executable logic routines (e.g., lines of code, software programs, etc.) that are stored on a non-transitory computer readable medium (e.g., the memory circuitry 301) and are executed by the processor circuitry 302).

Furthermore, the operations of the electronic device 300 may be considered a method that the electronic device 300 is configured to carry out. Also, while the described functions and operations may be implemented in software, such functionality may as well be carried out via dedicated hardware or firmware, or some combination of hardware, firmware and/or software.

The memory circuitry 301 may be one or more of a buffer, a flash memory, a hard drive, a removable media, a volatile memory, a non-volatile memory, a random access memory (RAM), or other suitable device. In a typical arrangement, the memory circuitry 301 may include a non-volatile memory for long term data storage and a volatile memory that functions as system memory for the processor circuitry 302. The memory circuitry 301 may exchange data with the processor circuitry 302 over a data bus. Control lines and an address bus between the memory circuitry 301 and the processor circuitry 302 also may be present (not shown in FIG. 3). The memory circuitry 301 is considered a non-transitory computer readable medium.

The memory circuitry 301 may be configured to store information and/or data (such as the first data set, the predictive model, the one or more parameters, the one or more conflict data patterns, the conflict result parameter, and/or the confidence score) in a part of the memory.

FIG. 4 is an illustration of an exemplary method according this disclosure presented as scheme. The illustrated scheme is based on multiple techniques and 'strong' ensemble for predicting a conflict outcome. Ensemble model provides high level of accuracy with minimized error by factoring 'boosting' across multiple model combinations. Ensemble methods ensure the weak learners to combine sequentially and boost the performance of, at a combined' level, which technique is going to be strong learner referred as ensembled model. From FIG. 4, iterative process may be followed by the example mentioned steps e.g.:

1) Model F1 try to fit few data points correctly and rest data points incorrectly
2) Model F2 focus more on the data points which were not correctly classified by Model F1. So model F2 gives more weightage to misclassified points and create decision boundary to correctly classify few of the data points.
3) Model F2 not be able to correctly classify all data points so again these data points are to be assigned higher weightage and model F3 try to attempt this by making correct classification.
4) This process continues until models F1, F2 etc. converge to an optimal accuracy across all data points by classifying maximum instances correctly. All these individual models F1, F2 . . . Fn are 'weak learners' as these models can predict only few instances correctly, but when performing an ensemble of such 'weak learners', a strong learner which is capable to classify all instances correctly is obtained. For example, after all iterations and hyperparameter tuning, optimal model which can give higher accuracy is obtained. The experimental setup all different classification approaches like decision tree, probabilistic and kernel based polynomial implementations to choose 'best in class' solution.

It may be appreciated that the disclosed technique allows for extendibility. Also, prediction for conflict outcome can yield precise auto-resolution. For example, a manual step can be completely eliminated for the cases which can be scored with high score by system to decide conflict status. The disclosed technique can be applied inland conflict handling (e.g. inland dispute). Learnings from ocean disputes can help designing better performing model for other types of conflicts. The disclosed technique can be extended to identify invoice issues and take proactive actions to avoid invoice disputes ('reactive' to 'proactive' resolution). The disclosed technique can enable a clear indication of any anomalies in the dispute pattern and avoid systemic issues or possible fraud.

The disclosed technique offers technical capability and extendibility to handle various touch points of the transport and logistics field ranging from proactive conflict identification, identifying key issues for conflict, customer risk profiling based on booking and dispute patterns and automated conflict resolution to speedup receivables. The disclosed technique considers seasonal patterns, booking dimensions, customer profile, shipment attributes and email content to derive a unique metric which can be estimated as predictive dispute outcome. The disclosed technique can be integrated with image recognition capability (Optical Character Recognition, OCR) to extend it for invoice recognition. This supports 'on-the-fly' conflict resolution.

FIG. 5 is an illustration of an example data set 500. In some embodiments, the data set 500 corresponds to the first data set disclosed herein. In some embodiments, the data set 500 corresponds to the second data set disclosed herein.

The data set 500 may have one or more dimensions. In one or more embodiments, the data set 500 has a plurality of dimensions 52, 53, 54, 55. The plurality of dimensions may be related to the one or more systems which are the source of the data set 500, e.g. one or more of: a shipment system, a dispute resolution system, a customer system, an invoicing system, and a case management system. For example, the one or more dimensions may comprise a first dimension indicative of shipment 52, a second dimension indicative of dispute 53, a third dimension indicative of a customer 54, a fourth dimension indicative of time 55 (e.g. a date and/or time), and/or a fifth dimension indicative of an invoice (not shown).

For example, the data set 500 may be indicative of shipment 52 related information e.g. coming from the shipment system (such as a country of origin of a shipment). For example, the shipment 52 related information can be enhanced (such as augmented) with shipment details (e.g. trade lane name) and respective dispute 53, customer 54 and/or time dimension 55.

For example, the data set 500 may be indicative of dispute 53 related information e.g. coming from dispute resolution system (such as a reason of dispute, for example the definition of the reason of dispute) and/or from invoice(s) raised at the time of booking made by customers (e.g. incorrect invoice). For example, the dispute 53 related information can be enhanced (such as augmented) with shipment details and respective customer 54, shipment 52 and/or time dimension 55.

For example, the data set 500 may be indicative of customer 54 related information e.g. coming from the customer system (such as a client database, for example a Customer Relation Management, CRM system). For example, the customer 54 related information can be enhanced (such as augmented) with shipment details and respective dispute 53, shipment 52 and/or time dimension 55.

For example, the data set 500 may be indicative of time 55 (e.g. a date and/or time) related information e.g. coming from the dispute resolution system (such as a date of a document, a date of opening of the dispute) and/or from invoice(s) raised at the time of booking made by customers. For example, the time 55 related information can be enhanced (such as augmented) with shipment details and respective customer 54, dispute 53, and/or shipment dimension 52.

Embodiments of methods and products (electronic device) according to the disclosure are set out in the following items:

1. A method, performed by an electronic device, for controlling a process for handling a conflict, the method comprising:
   obtaining (S102) a first data set from one or more systems;

determining (S106), based on the first data set and a predictive model having one or more parameters, one or more conflict data patterns indicative of a conflict; and predicting (S108), based on the one or more conflict data patterns, a conflict result parameter and a confidence score associated with the conflict result parameter.

2. The method according to item 1, wherein the one or more systems are operation systems, wherein the one or more operation systems comprise one or more of: a shipment system, a dispute resolution system, a customer system, an invoicing system, and a case management system.

3. The method according to any of the previous items, wherein obtaining (S102) the first data set comprises obtaining (S102A) a second data set from the one or more systems and pre-processing (S102B) the second data set to obtain the first data set.

4. The method according to item 3, wherein pre-processing (S102B) the second data set comprises reducing (S102BB) noise in the second data set.

5. The method according to any of items 3-4, wherein pre-processing (S102B) the second data set comprises normalizing (S102BC) the second data set.

6. The method according to any of items 3-5, wherein pre-processing (S102B) the second data set comprises applying (S102BD) a transformation to the second data set.

7. The method according to any of the previous items, the method comprising obtaining (S103) a feature selection based on the first data set.

8. The method according to item 7, wherein the one or more conflict data patterns are further determined based on the feature selection.

9. The method according to any of the previous items, the method comprising optimizing (S104) the one or more parameters based on a selection of feedback parameters from the predictive model.

10. The method according to any of the previous items, wherein the one or more parameters comprise one or more parameters for configuration of the predictive model.

11. The method according to any of the previous items, the method comprising:
receiving (S110) an approval indicator from an approval authority system,
wherein determining (S106), based on the first data set and the predictive model having one or more parameters, the one or more conflict data patterns comprises determining (S106A) the one or more conflict data patterns, based on the first data set, the predictive model having one or more parameters, and the approval indicator.

12. The method according to any of the previous items, wherein the predictive model comprises one or more of: an ensemble technique, a classification model, a tree-based model, and a combination of any of the ensemble technique, the classification model, and the tree-based model based on one or more weight factors.

13. The method according to any of the previous items, wherein the one or more conflict data patterns comprise a booking data pattern, a dispute data pattern, and a revenue data pattern.

14. The method according to any of the previous items, the method comprising:
determining (S112) whether the confidence score satisfies a criterion, and
when it is determined that the confidence score does not satisfy the criterion, transmitting (S114) a request to the approval authority system.

15. The method according to any of the previous items, the method comprising:
when it is determined that the confidence score satisfies the criterion, providing (S113) the conflict result to a user in accordance to the conflict result parameter.

16. The method according to any of the previous items, the method comprising testing (S116) the conflict result parameter against historical conflict result data.

17. The method according to item 16, the method comprising estimating (S118) accuracy based on iterative testing.

18. The method according to any of the previous items, the method comprising: estimating (S120) a customer risk data profile based on the conflict result parameter, and one or more of: season data, a booking pattern, and a revenue pattern.

19. The method according to any of the previous items, wherein the conflict result parameter indicates a likelihood that a conflict exists or a likelihood that a conflict does not exist.

20. An electronic device comprising memory circuitry, processor circuitry, and interface circuitry, wherein the electronic device is configured to perform any of the methods according to any of items 1-19.

21. A computer readable storage medium storing one or more programs, the one or more programs comprising instructions, which when executed by an electronic device cause the electronic device to perform any of the methods of items 1-19.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-5 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly to be regarded in an illustrative rather than restrictive sense. The claimed disclosure is intended to cover all alternatives, modifications, and equivalents.

What is claimed is:

1. A computer-implemented method, performed by an electronic device, for controlling a process for handling a conflict, the method comprising:
   receiving, at a first computer system, an electronic data conflict query from a second computer system, the first computer system comprising one or more processors;
   identifying, by the one or more processors, and based on the electronic data conflict query, a first electronic data set, the first electronic data set comprising data associated with one or more of: a shipment system, a dispute resolution system, a customer system, or a case management system;
   determining, by the one or more processors, a feature selection based on the first electronic data set;
   determining, by the one or more processors and based on the feature selection, one or more parameters of a machine-learned predictive model, the predictive model comprising an ensemble model comprising a first machine-learned model and a second machine-learned model, the first machine-learned model and the second machine-learned model trained based on one or more iterative cycles of training, each cycle comprising generating a first output by the first machine-learned model, adjusting weights of the second machine-learned model based on errors associated with the first output, and generating a second output by the second machine-learned model based on the adjusted weights;
   instantiating, by the one or more processors, the predictive model based at least in part on the one or more parameters;
   identifying, by the one or more processors, based on the first data set and the predictive model, one or more conflict data patterns indicative of a conflict, the one or more conflict data patterns associated with one or more of: a data conflict between a first dimension and a second dimension of the first electronic data set; or a data conflict between the first electronic data set and a second electronic data set, the first electronic data set associated with the first computer system and the second electronic data set associated with the second computer system;
   generating, by the one or more processors and based on the one or more conflict data patterns, a conflict result parameter and a confidence score associated with the conflict result parameter, the conflict result parameter associated with a predicted existence of the data conflict; and
   based on the conflict result parameter and the confidence score, one or more of, by the one or more processors:
      transmitting a conflict result to the second computer system;
      resolving the data conflict; or
      transmitting an approval request to an approval authority system.

2. The method according to claim 1, wherein obtaining the first electronic data set comprises obtaining a third electronic data set from the one or more systems and pre-processing the third electronic data set to obtain the first data set.

3. The method according to claim 2, wherein pre-processing the third electronic data set comprises reducing noise in the third electronic data set.

4. The method according to claim 2, wherein pre-processing the third electronic data set comprises normalizing the second data set.

5. The method according to claim 2, wherein pre-processing the third electronic data set comprises applying a transformation to the second data set.

6. The method according to claim 1, wherein the one or more conflict data patterns are further determined based on the feature selection.

7. The method according to claim 1, the method comprising optimizing the one or more parameters based on a selection of feedback parameters from the predictive model.

8. The method according to claim 1, wherein the one or more parameters comprise one or more parameters for configuration of the predictive model.

9. The method according to claim 1, the method comprising:
   receiving an approval indicator from an approval authority system,
   wherein determining, based on the first data set and the predictive model having one or more parameters, the one or more conflict data patterns comprises determining the one or more conflict data patterns, based on the first data set, the predictive model having one or more parameters, and the approval indicator.

10. The method according to claim 1, wherein the predictive model further comprises one or more of: a classification model, a tree-based model, or a combination of any of the ensemble model, the classification model, and the tree-based model based on one or more weight factors.

11. The method according to claim 1, wherein the one or more conflict data patterns comprise a booking data pattern, a dispute data pattern, and a revenue data pattern.

12. The method according to claim 9, the method comprising:
   determining whether the confidence score satisfies a criterion, and
   when the confidence score is determined not to satisfy the criterion, transmitting a request to the approval authority system.

13. The method according to claim 1, the method comprising:
   when the confidence score satisfies a criterion, providing the conflict result to a user and/or to a system in accordance with the conflict result parameter.

14. The method according to claim 1, the method comprising testing the conflict result parameter against historical conflict result data.

15. The method according to claim 14, the method comprising estimating accuracy based on iterative testing.

16. The method according to claim 1, the method comprising: estimating a customer risk data profile based on the conflict result parameter, and one or more of: season data, a booking pattern, and a revenue pattern.

17. The method according to claim 1, wherein the conflict result parameter indicates a likelihood that a conflict exists or a likelihood that a conflict does not exist.

18. The computer-implemented method of claim 1, comprising:
   transmitting the approval request to the approval authority system;
   receiving, from the approval authority system, an approval indicator; and
   re-training the predictive model based at least in part on the approval indicator.

19. An electronic device comprising memory circuitry, processor circuitry, and interface circuitry, wherein the electronic device is configured to perform operations comprising:
   receiving, at a first computer system, an electronic data conflict query from a second computer system, the first computer system comprising one or more processors;
   identifying, by the one or more processors, and based on the electronic data conflict query, a first electronic data set, the first electronic data set comprising data associated with one or more of: a shipment system, a dispute resolution system, a customer system, or a case management system;
   determining, by the one or more processors, a feature selection based on the first electronic data set;
   determining, by the one or more processors and based on the feature selection, one or more parameters of a machine-learned predictive model, the predictive model comprising an ensemble model comprising a first machine-learned model and a second machine-learned model, the first machine-learned model and the second machine-learned model trained based on one or more iterative cycles of training, each cycle comprising generating a first output by the first machine-learned model, adjusting weights of the second machine-learned model based on errors associated with the first output, and generating a second output by the second machine-learned model based on the adjusted weights;
   instantiating, by the one or more processors, the predictive model based at least in part on the one or more parameters;
   identifying, by the one or more processors, based on the first data set and the predictive model, one or more conflict data patterns indicative of a conflict, the one or more conflict data patterns associated with one or more of: a data conflict between a first dimension and a second dimension of the first electronic data set; or a data conflict between the first electronic data set and a second electronic data set, the first electronic data set associated with the first computer system and the second electronic data set associated with the second computer system;
   generating, by the one or more processors and based on the one or more conflict data patterns, a conflict result parameter and a confidence score associated with the conflict result parameter, the conflict result parameter associated with a predicted existence of the data conflict; and
   based on the conflict result parameter and the confidence score, one or more of, by the one or more processors:
   transmitting a conflict result to the second computer system;
   resolving the data conflict; or
   transmitting an approval request to an approval authority system.

* * * * *